Patented Feb. 17, 1931

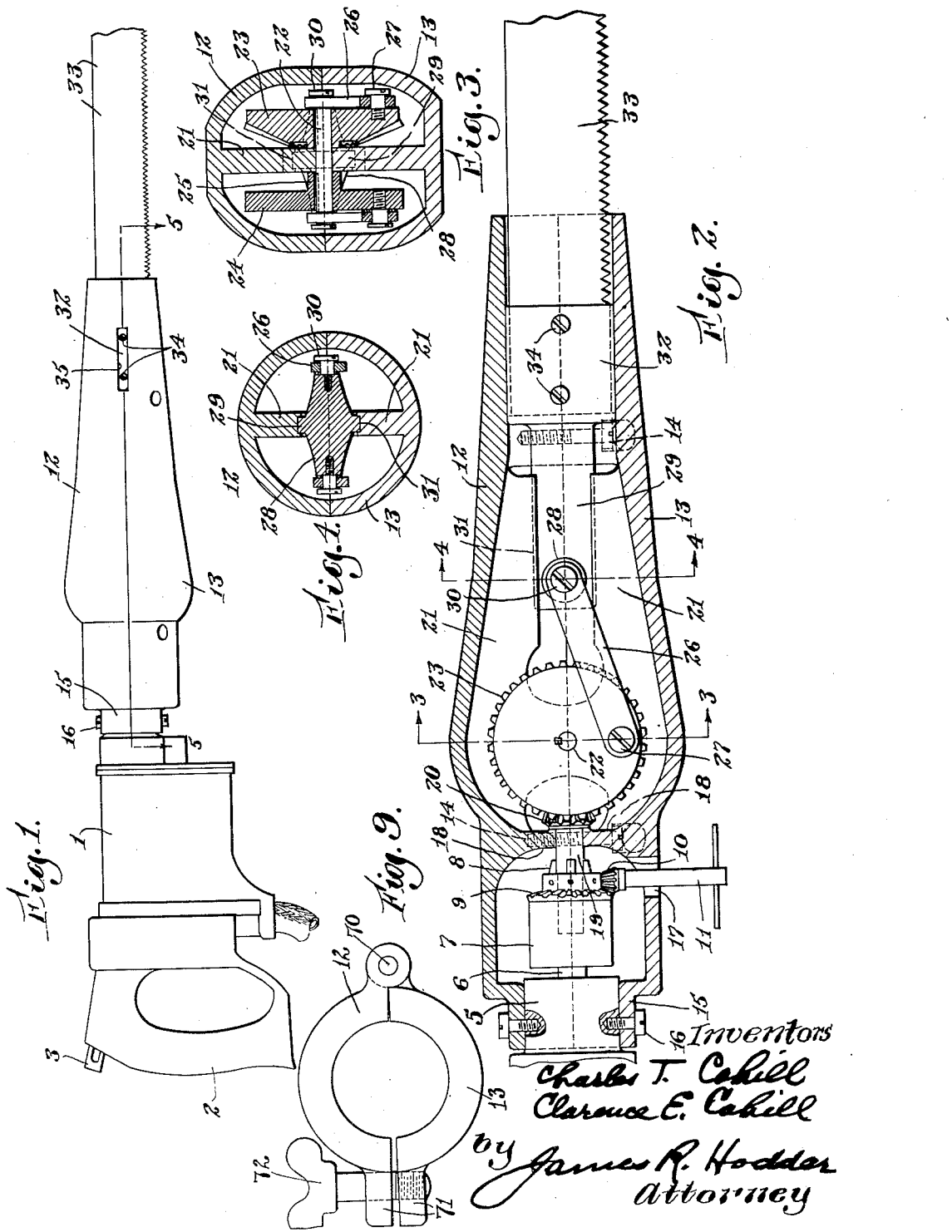

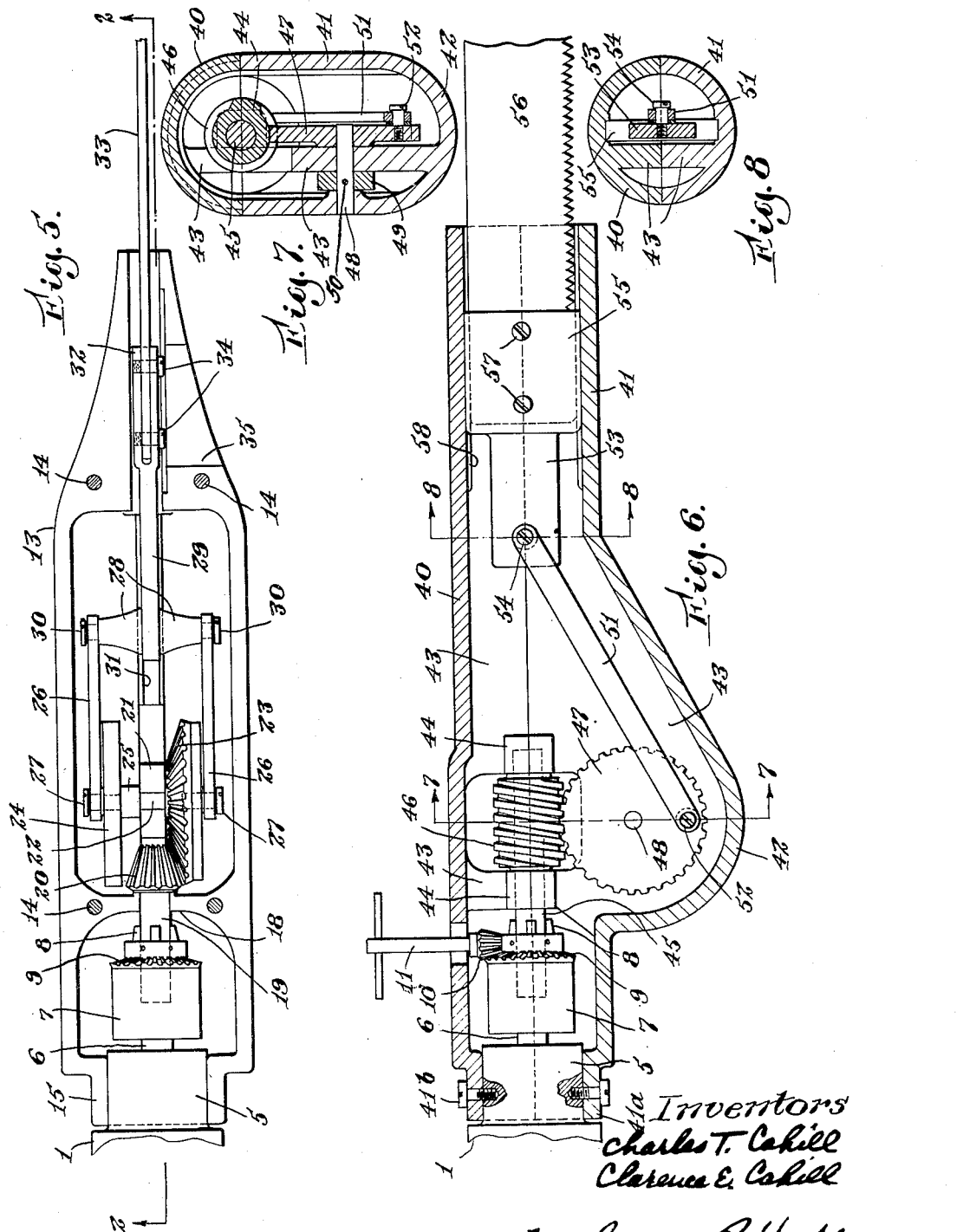

1,793,053

UNITED STATES PATENT OFFICE

CHARLES T. CAHILL, OF CAMBRIDGE, AND CLARENCE E. CAHILL, OF SWAMPSCOTT, MASSACHUSETTS

SAW

Application filed May 23, 1929. Serial No. 365,529.

Our present invention relates to saws, and more particularly to power driven saws which are applicable to portable power tools, such as electrically operated hand drills.

An important object of the present invention is the provision of a novel saw mechanism applicable to a portable tool, such as an electric drill, which saw will be driven by the rotating chuck of said tool.

Another object of the invention is the provision of means to convert the rotations of said chuck into reciprocations of the saw blade.

Another feature of the invention is the provision of novel means, interposed between the saw and the chuck of the tool, to which the device is attached, to accomplish the above mentioned conversion.

Another object of the invention resides in the ease of attachment of our novel device to present and existing portable tools.

Other objects consist in the simplicity of construction of our novel device, the ruggedness and efficiency thereof, and the economy of manufacture thereof.

A further feature of the invention resides in the fact that no changes or alterations are required in the construction of the portable tools to which the device is attached. In applying the device to an electrically operated portable drill, for example, the casing of the device is provided with a projecting sleeve, adapted to fit over the spindle collar and to be attached thereto by suitable attaching devices, such as screws. It is the work of but a moment to accomplish this attachment, and on tightening of the chuck jaws around the driven shaft of the device, said device is ready for operation.

It will be appreciated that any type of saw blade may be utilized, whether rip, cross-cut, key-hole or otherwise.

The above and other features and objects of the invention, details of construction, combinations of parts and advantages, will be hereinafter more fully pointed out, described and claimed.

Referring to the drawings, illustrating a preferred embodiment of the present invention, Fig. 1 is a side elevation of our novel device assembled with a portable electric drill;

Fig. 2 is a longitudinal sectional view on the line 2—2 of Fig. 5;

Fig. 3 is a cross-sectional view on the line 3—3 of Fig. 2;

Fig. 4 is a cross-sectional view on the line 4—4 of Fig. 2;

Fig. 5 is a longitudinal sectional view on the line 5—5 of Fig. 1;

Fig. 6 is a longitudinal sectional view of a modified form of saw driving mechanism;

Fig. 7 is a cross-sectional view on the line 7—7 of Fig. 6;

Fig. 8 is a cross-sectional view on the line 8—8 of Fig. 6; and

Fig. 9 is an end elevation illustrating a modified form of uniting the casing sections.

Referring now to the drawings, for a particular description of the invention, its construction, assembly and operation, 1 designates generally the body of a portable electric drill within which is housed a suitable motor (not shown), this drill having a handle 2 and switch 3, current conducting wires 4 leading to the motor in the housing 1 from any suitable source of power. The drill 1 has a collar 5 as a bearing for the shaft 6 of the chuck 7, adjustable chuck jaws 8 being carried by said chuck, the chuck having a beveled gear 9 adapted to be engaged by the beveled end 10 of a wrench 11 for tightening the chuck jaws around an object to be clamped therein. The structure thus far described is well-known in the art, and is not illustrated or described in detail.

Our novel device comprises a casing consisting of two sections 12 and 13 united by screws 14, the projecting ends of these sections forming a sleeve 15 adapted to be secured by screws 16 to the collar 5 of the drill 1 for firmly attaching the entire device thereto. An aperture 17 is provided through the lower casing section 13 for admission of the wrench 11. The sections 12 and 13 are provided with transverse webs 18, 18, to form a bearing for the shaft 19 carrying a beveled pinion 20.

The sections 12 and 13 are also provided with longitudinal webs 21, 21, to form a bearing for the shaft 22, on which shaft is keyed a beveled gear 23 adapted to mesh with the pinion 20. On the opposite side of the webs 21 the shaft 22 carries a wheel or disc 24 having a spacing hub 25 thereon.

A pair of pitmen 26 are pivotally attached to the gear 23 and wheel 24 and eccentrically thereof by screws 27, suitable spacing washers being provided as illustrated. These pitmen are pivotally connected at their other ends to the arms 28 of a saw post 29 by screws 30.

The partitions 21 are provided with grooves 31 to act as guides for the post 29. The head of the post 29 is yoked, as illustrated at 32, and within this yoke is fitted one end of a saw 33, screws 34 securely retaining said saw in said yoke, a slot 35 being provided through the casing for attachment or removal of said screws 34. The head 32 will have a sliding fit between the casings 12 and 13, as clearly illustrated in Fig. 2, thus providing a guiding and alining means for the saw 33.

The operation of the device is simple and will be readily understood, being briefly described as follows:

The device having been attached to a portable drill 1, and the chuck jaws 8 having been tightened over the shaft 19 by means of the wrench 11, the operator moves the switch 3 to admit current to the motor housed in the drill 1. This will result in rotation of the chuck 7 and consequently in rotation of the shaft 19 and beveled pinion 20. Such rotation will be transmitted to the shaft 22, through the medium of the beveled gear 23, and will also result in simultaneous rotation of the wheel 24 with the gear 23. Rotation of the wheel 24 and gear 23 will operate the pitman 26, carried thereby, and will reciprocate the post 29, head 32 and saw 33, the eccentric mounting of the pitmen 26 on the wheel 24 and gear 23 converting the rotations of said wheel and gear into reciprocations of the post 29 and saw carried thereby. Reciprocation of the saw will continue until the operator moves the switch to cut off the current to the motor.

It will thus be seen that we have devised a neat, efficient and simple saw attachment, and since we believe the same is novel, we have claimed said device in this application.

In Figs. 6, 7 and 8 we have illustrated a slightly modified form of attachment, comprising casing sections 40 and 41 having a projecting sleeve 41a secured to the collar 5 of the drill 1 by screws 41b. The section 41 has a depending pocket 42 and each of the sections 40 and 41 has longitudinally extending webs 43, 43, 43, in which are formed journals 44 for the shaft 45 secured in the chuck jaws 8. This shaft 45 carries a worm pinion 46 intermediate the journals 44, said pinion meshing with a worm gear 47 mounted on a shaft 48 having bearings in the partition 43 and in the section 41, a spacing washer or member 49 being interposed between said partition and the wall of the casing and secured to the shaft 48 by a pin 50.

A pitman 51 is pivotally attached to the gear 47 by screw 52, said mounting being eccentric on said gear. The other end of the pitman 51 is pivotally attached to a saw post 53 by screw 54, this post having a yoked head 55 in which one end of a saw 56 is secured by screws 57, grooves 58 being provided in the sections 40 and 41 to act as guides and alining means for the head 55 and the saw carried thereby.

The operation of this form of the device is extremely simple, the shaft 45 being rotated by the chuck 7 and in turn rotating the pinion 46, which in turn rotates the gear 47 which actuates the pitman 51, effecting a reciprocation of the post 53, head 55 and saw 56. This form of our invention is also easy to manufacture and assemble, is economical, easy to attach to the drill 1, and efficient in operation and is well within the range of the present invention and is therefore claimed in this application.

While we have necessarily described our present invention somewhat in detail, it will be understood and appreciated that we may vary the size, shape and arrangement of parts within reasonably wide limits without departing from the spirit of the invention.

If desired, and as illustrated in Fig. 9, we may hinge the casing sections 12 and 13, as illustrated at 70, and provide, on the side opposite the said hinge, lugs 71, wing nuts 72 cooperating with said lugs to clamp the said casing sections around the collar 5, as well as to firmly unite said sections throughout their length.

While we have illustrated a saw as the operated tool in this application, it will be appreciated that we may utilize a file, chisel, tamping tool, drill or other instrumentality wherein a reciprocating motion is desirable for proper functioning of the tool, and that any of the aforesaid tools, or their equivalents, are well within the range of the present invention.

The invention is further described and defined in the form of a claim as follows:

The combination with a portable power driven tool having an adjustable chuck, of a saw, means operable by said chuck to effect reciprocation of said saw, a sectional casing within which said reciprocating means is contained, said casing having an aperture therethrough to permit access to said chuck, a non-rotating collar on said tool, said casing sections terminating in a sleeve adapted to fit over said collar, and means to rigidly fix said casing to said collar, whereby the reciprocation of said saw will be independent of movement of said casing.

In testimony whereof, we have signed our names to this specification.

CHARLES T. CAHILL.
CLARENCE E. CAHILL.